United States Patent
Prud'Homme-Lacroix et al.

(10) Patent No.: US 11,192,641 B2
(45) Date of Patent: Dec. 7, 2021

(54) AIRCRAFT AND LANDING GEAR PROVIDED WITH AT LEAST ONE PAIR OF SHOCK ABSORBERS, AND A METHOD PERFORMED BY SAID LANDING GEAR

(71) Applicant: AIRBUS HELICOPTERS, Marignane (FR)

(72) Inventors: Pierre Prud'Homme-Lacroix, Vitrolles (FR); Patrice Garcin, Ensues (FR)

(73) Assignee: AIRBUS HELICOPTERS, Marignane (FR)

(*) Notice: Subject to any disclaimer, the term of this patent is extended or adjusted under 35 U.S.C. 154(b) by 620 days.

(21) Appl. No.: 15/078,399

(22) Filed: Mar. 23, 2016

(65) Prior Publication Data
US 2016/0280362 A1  Sep. 29, 2016

(30) Foreign Application Priority Data

Mar. 25, 2015 (FR) ..................... 15 00597

(51) Int. Cl.
*B64C 25/52* (2006.01)
*B64C 25/60* (2006.01)
(Continued)

(52) U.S. Cl.
CPC .............. *B64C 25/52* (2013.01); *B64C 25/58* (2013.01); *B64C 25/60* (2013.01); *F16F 9/20* (2013.01); *B64C 2025/325* (2013.01)

(58) Field of Classification Search
CPC ......... B64C 25/52; B64C 25/58; B64C 25/60; B64C 25/02; B64C 2025/325;
(Continued)

(56) References Cited

U.S. PATENT DOCUMENTS 2,574,299 A * 11/1951 Sterrett ................... F01B 17/00
                                                  92/166
2,919,870 A *  1/1960 Doolittle ................. B64C 25/52
                                                  244/105

(Continued)

FOREIGN PATENT DOCUMENTS

DE        1104833      4/1961
FR        2761745      10/1998

OTHER PUBLICATIONS

French Search Report for French Application No. 1500597, Completed by the French Patent Office dated Jan. 20, 2016, 8 Pages.

*Primary Examiner* — Medhat Badawi
*Assistant Examiner* — Vicente Rodriguez
(74) *Attorney, Agent, or Firm* — Brooks Kushman P.C (57) ABSTRACT

Landing gear for an aircraft, the landing gear having at least one pair of shock absorbers comprising a first shock absorber and a second shock absorber, each shock absorber comprising a cylinder defining an inside space and a rod carrying a piston, the inside space being subdivided at least into a "primary" chamber and into a "secondary" chamber, the shock absorber including at least one throttling orifice putting the secondary chamber into fluid flow communication with the primary chamber. The primary chamber of the first shock absorber is connected to the secondary chamber of the second shock absorber of the pair by a first pipe, and the secondary chamber of the first shock absorber of the pair is connected to the primary chamber of the second shock absorber of the pair by a second pipe.

14 Claims, 5 Drawing Sheets

(51) Int. Cl.
   *B64C 25/58* (2006.01)
   *F16F 9/20* (2006.01)
   *B64C 25/32* (2006.01)

(58) Field of Classification Search
   CPC ......... B64C 2025/008; F16F 9/20; F16F 9/34; F16F 9/06; F16F 9/064; F16F 9/26; F16F 9/504; F16F 9/512; F16F 9/062; F16F 9/063; F16F 9/22; F16F 9/466; F16F 9/486; F16F 9/49; F16F 7/1017; B60G 17/0152; B60G 2204/80; B60G 2204/8304; B60G 21/06; B60G 21/073; B60G 2202/154
   See application file for complete search history.

(56) References Cited

U.S. PATENT DOCUMENTS

| | | | | |
|---|---|---|---|---|
| 2,933,270 A * | 4/1960 | Maltby | ............... | B64C 25/34 244/103 R |
| 3,173,632 A | 3/1965 | Woods | | |
| 4,519,559 A | 5/1985 | Logan et al. | | |
| 4,645,143 A * | 2/1987 | Coffy | ............... | B64C 25/52 244/100 R |
| 4,771,678 A * | 9/1988 | Walker | ............... | F01B 29/00 403/377 |
| 5,310,140 A * | 5/1994 | Veaux | ............... | B64C 25/001 244/104 FP |
| 6,168,142 B1 * | 1/2001 | Bolukbasi | ............... | F16F 9/0218 244/104 R |
| 6,296,235 B1 * | 10/2001 | Dalal | ............... | B60G 21/106 267/64.16 |
| 6,517,094 B1 * | 2/2003 | Kincaid | ............... | B60G 21/073 280/124.106 |
| 7,918,417 B2 * | 4/2011 | Mouille | ............... | B64C 25/52 244/108 |
| 8,459,417 B2 * | 6/2013 | Masson | ............... | F16F 9/063 188/269 |
| 2006/0091635 A1 * | 5/2006 | Cook | ............... | B60G 3/06 280/124.106 |
| 2011/0133378 A1 * | 6/2011 | Dunn | ............... | B64C 25/52 267/217 |
| 2013/0146706 A1 * | 6/2013 | Prudhomme-Lacroix | ............... | B64C 25/10 244/102 R |

* cited by examiner

AIRCRAFT AND LANDING GEAR PROVIDED WITH AT LEAST ONE PAIR OF SHOCK ABSORBERS, AND A METHOD PERFORMED BY SAID LANDING GEAR

CROSS REFERENCE TO RELATED APPLICATION

This application claims priority to French patent application No. FR 15 00597 filed on Mar. 25, 2015, the disclosure of which is incorporated in its entirety by reference herein.

BACKGROUND OF THE INVENTION (1) Field of the Invention

The present invention relates to landing gear having at least one pair of shock absorbers, and to an aircraft provided with such landing gear. The invention also relates to the method performed by the landing gear.

More precisely, the invention lies in the technical field of skid landing gear for rotorcraft.

(2) Description of Related Art

Conventionally, a rotorcraft has landing gear on which the rotorcraft stands when on the ground. More particularly, types of landing gear include landing gear referred to as "skid" landing gear, which is provided with first and second longitudinal bearing skids. The skids are for coming into contact with the ground and they are arranged on either side of a vertical anteroposterior plane of the rotorcraft. The first and second longitudinal bearing skids together define a plane referred to as the "bearing" plane, for convenience.

The aircraft then stands on the ground via two elongate skids.

In order to connect each skid to the fuselage of the aircraft, skid landing gear may be provided with a first cross-member and with a second cross-member, each extending transversely and connecting the first skid and the second skid to the fuselage.

The first cross-member is said to be a "front" cross-member since the first cross-member connects the fuselage to zones that are situated at the front ends of the first and second longitudinal skids. Conversely, the second cross-member is said to be a "rear" cross-member insofar as the second cross-member connects the fuselage to zones situated at the rear ends of the first and second longitudinal skids.

The landing gear is then fastened to the aircraft via its front and rear cross-members. A cross-member comprises at least one tube that is oriented transversely.

At least one cross-member may be continuous, extending continuously from the first skid to the second skid. Alternatively, at least one cross-member may be discontinuous, this cross-member having a first segment fastened to the first skid and a second segment that is independent of the first segment and that is fastened to the second skid.

Such landing gear enables rotorcraft to stand on multiple types of surface.

Furthermore, rotorcraft landing gear is subjected mainly to two types of stress during landing: vertical stress associated with vertical forces and moments extending in a vertical direction, and roll and pitching stresses associated with forces and moments resulting from roll and pitching movements of the rotorcraft.

These stresses, in particular the roll and pitching stresses, can give rise to the ground resonance phenomenon on a rotorcraft that has a lift rotor carrying hinged blades.

In order to limit the risks of the ground resonance phenomenon appearing, a manufacturer can seek to damp the modes of vibration of the fuselage supported by its landing gear.

For example, at least one shock absorber may be arranged directly between a cross-member and the fuselage.

By way of example, such a shock absorber may comprise a cylinder and a rod carrying a piston. The cylinder then defines an inside space that is filled with a fluid. The piston moves in the inside space. Under such circumstances, the piston subdivides the inside space into a top chamber and a bottom chamber.

In addition, in order to provide damping, the piston may include at least one throttling orifice. Each throttling orifice passes through the thickness of the piston so as to open out both into the top chamber and into the bottom chamber. Thus, a throttling orifice puts the top and bottom chambers into fluid flow communication.

Thereafter, a movement of the cross-member relative to the fuselage causes the piston to move in the inside space of the cylinder. The fluid contained in one chamber then passes through the throttling orifice so as to reach the other chamber. The throttling of the fluid through the throttling orifice conventionally serves to provide damping.

During a roll mode of operation, the fuselage of the aircraft oscillates on the ground about a roll axis relative to the landing gear. The piston moves relative to the cylinder through a small amplitude and at a slow speed of the order of a few centimeters per second. In order to be effective during such a roll mode of operation in limiting any risk of the ground resonance phenomenon appearing, the shock absorber is dimensioned so as to exert a predetermined opposing force when the piston is traveling relative to the cylinder with such an amplitude and at such a speed.

Nevertheless, during a landing mode of operation, the fuselage then moves substantially vertically relative to the landing gear. The piston then moves relative to the cylinder at a high speed of the order of a few meters per second. Because of this high speed, the shock absorber runs the risk of exerting an excessively large opposing force, given the way the shock absorber is necessarily dimensioned to obtain results that are satisfactory during the roll mode of operation.

The aircraft then has discharge devices for limiting the opposing force from the shock absorber during the landing mode of operation.

For example, the piston may include discharge orifices suitable for opening out into each of the chambers. Nevertheless, each discharge orifice is closed by a resilient overpressure device. At least one resilient overpressure device releases at least one associated discharge orifice when the force currently being opposed by the shock absorber exceeds a force threshold. Opening at least one discharge orifice enables the total flow sectional area for the fluid through the piston to be increased, thereby peak-limiting the opposing force generated by the shock absorber.

Those discharge devices act only when the opposing force exceeds a certain threshold. The behavior of the shock absorber thus varies over two distinct operating domains, namely between a first operating domain while the opposing force remains below the above-mentioned threshold and a second domain while the opposing force is above the threshold.

Consequently, the manufacturer dimensions the shock absorber to generate the maximum opposing force desired during the roll mode of operation in order to avoid the ground resonance phenomenon appearing. Conversely, the manufacturer limits this maximum opposing force in order to achieve an opposing force that is acceptable during the landing mode of operation. Consequently, the performance of the shock absorber is diminished, the opposing force obtained during the roll mode of operation ending up lower than the maximum opposing force as a result of the applied limit.

Documents U.S. Pat. No. 4,519,559, FR 2 761 745, U.S. Pat. No. 3,173,632, and DE 1 104 833 are known. Document FR 2 761 745 does not form part of the technical field of landing gear and provides no solution to the above-described problem. Document FR 2 761 745 is cited purely by way of information.

BRIEF SUMMARY OF THE INVENTION

An object of the present invention is thus to propose skid landing gear provided with at least one pair of shock absorbers tending to limit the drawbacks that result from the shock absorbers being stressed during a landing mode of operation.

The invention thus provides landing gear for an aircraft, the landing gear being provided with a first longitudinal bearing skid and a second longitudinal bearing skid together with a cross-member referred to as a "front" cross-member and a cross-member referred to as a "rear" cross-member, each cross-member extending transversely and suitable for connecting the first skid and the second skid to a fuselage of the aircraft, each cross-member having a first branch connected to the first skid and a second branch connected to the second skid, the first skid and the second skid being situated transversely on either side of a vertical anteroposterior plane of symmetry.

The term "each cross-member has a first branch connected to the first skid and a second branch connected to the second skid" means that the first skid is connected to the fuselage by the first branch of the first cross-member and the first branch of the second cross-member, while the second skid is connected to the fuselage by the second branch of the first cross-member and by the second branch of the second cross-member.

Each cross-member may be a continuous cross-member extending continuously from the first skid to the second skid, or it may be a discontinuous cross-member.

The landing gear also includes at least one pair of shock absorbers comprising a first shock absorber and a second shock absorber arranged transversely on either side of the anteroposterior plane, each shock absorber being attached to a cross-member.

The term "each shock absorber being attached to a cross-member" means that each shock absorber is attached to the first cross-member or to the second cross-member. Various configurations are described below. The shock absorbers of a pair can then be arranged on the same cross-member or on two different cross-members.

Each shock absorber comprises a cylinder defining an inside space and a rod carrying a piston, the inside space being subdivided at least into a chamber referred to as "primary" chamber possessing an inside volume that decreases when the rod is pushed into the cylinder and into a chamber referred to as "secondary" chamber, each of the chambers being filled with a fluid, each shock absorber including at least one throttling orifice putting the secondary chamber and the primary chamber of the shock absorber into fluid flow communication, each piston defining in part at least one chamber in order to move the fluid.

Furthermore, the primary chamber of the first shock absorber of a pair is connected to the secondary chamber of the second shock absorber of said pair via a pipe referred to as a "first" pipe, and the secondary chamber of the first shock absorber of said pair is connected to the primary chamber of the second shock absorber of said pair by a pipe referred to as the "second" pipe.

The term "pipe" refers to a duct that may include at least one tube.

The term "defines in part at least one chamber" means that the piston of a shock absorber has a wall defining part of a chamber, and in particular a movable wall.

The landing gear thus includes at least one pair of shock absorbers having two shock absorbers. These two shock absorbers are arranged on either side of the anteroposterior plane, e.g. in symmetrical manner. In addition, each shock absorber is connected to the landing gear and to the fuselage of an aircraft provided with the landing gear.

Furthermore, the chambers of the two shock absorbers of a pair are in fluid flow communication. The coupling between the two shock absorbers leads to novel behavior that makes it possible to solve the problem of dimensioning the shock absorbers.

During a landing mode of operation, the pipes tend to neutralize the throttling orifices. The fluid tends to flow via the pipes and not via the throttling orifices.

While the fuselage is coming closer to the landing gear during a landing mode of operation, the primary chamber of the first shock absorber empties and tends to fill the secondary chamber of the second shock absorber by a flow via the first pipe. Likewise, the primary chamber of the second shock absorber empties and tends to fill the secondary chamber of the first shock absorber.

The fluid streams flowing in the pipes are therefore limited only by the diameter of the pipes. Since this diameter is large, the opposing force generated by the shock absorbers is small.

In contrast, during a roll mode of operation, the pipes coupling the two shock absorbers together do not prevent the hydraulic fluid from passing through the throttling orifices as a result of the relative movements of the pistons and the cylinders.

Each pipe connecting together the two shock absorbers of a pair of shock absorbers transmits substantially no fluid flow since both the chambers connected to any one pipe are behaving in the same manner as a result of the shock absorbers being arranged on either side of the anteroposterior plane.

For example, the primary chamber of the first shock absorber and the secondary chamber of the second shock absorber that are both connected to the first pipe tend to empty. Conversely, the primary chamber of the second shock absorber and the secondary chamber of the first shock absorber that are connected to the second pipe tend to fill.

The fluid contained in the shock absorbers is thus constrained to flow through the throttling orifices.

Consequently, a manufacturer determines the flow section of the pipes to minimize the opposing force generated by the shock absorbers during a landing mode of operation.

In independent manner, the same manufacturer determines the flow section of the throttling orifices to achieve the necessary opposing force during a roll mode of operation in order to avoid the ground resonance phenomenon appearing.

Such a device thus makes it possible to adjust the shock absorbers effectively for avoiding a ground resonance phenomenon.

The landing gear may also include one or more of the following additional characteristics.

Thus, the sections of the primary and secondary chambers of each shock absorber are preferably identical.

The term "section" refers to a section of a chamber on a horizontal plane perpendicular to an axis along which the rod extends. Under such circumstances, all of the sections of the chambers may be identical, for example.

In order to obtain this effect, the rod of each shock absorber may be a "through" rod passing right through the piston so as to extend both in the primary chamber and in the secondary chamber.

This characteristic makes it easier to dimension the system and optimizes its operation. This characteristic makes it possible to transport identical quantities of fluid in the pipes.

Furthermore, each pipe may open out into a chamber via a flow section referred to as a "pipe" section, each throttling orifice opening out into a chamber via a flow section referred to as a "throttling" section, each pipe section may present an area greater than the area of each throttling section.

Under such circumstances, the throttling orifices and the pipes are optimized to perform the above-described functions.

Each throttling orifice then acts during the roll mode of operation only. The order of magnitude of the relative travel speed between each piston and the associated cylinder may for example be of the order of 1 centimeter per second (cm/s) to 2 cm/s. By way of illustration, for a shock absorber having a diameter of 4 centimeters (cm), four throttling orifices of cylindrical shape, each presenting a diameter of 0.4 millimeters (mm), make it possible to generate an acceptable opposing force of the order of 100 decanewtons (daN) to 350 daN, which is sufficient to damp roll oscillation of the fuselage relative to the landing gear.

While in the landing mode of operation, the order of magnitude for the travel speed of each piston relative to the associated cylinder may for example be of the order of 0.5 meters per second (m/s) to 1 m/s. By way of illustration, for a shock absorber having a diameter of 4 cm, pipes presenting a diameter of 10 mm (millimeter) enable the opposing force of the shock absorber to be limited to a value of the order of 10 daN to 30 daN, for example.

The dissociated operation of each shock absorber depending on its mode of operation tends to make it easier to dimension the shock absorber.

Furthermore, at least one shock absorber includes a first attachment system that fastens the rod of the shock absorber to a cross-member, and a second attachment system suitable for fastening the cylinder of the shock absorber to said fuselage.

Alternatively, at least one shock absorber includes first attachment means that fastens the cylinder of the shock absorber to a cross-member, and second attachment means suitable for fastening the rod of the shock absorber to said fuselage.

Furthermore, in a first alternative, the first shock absorber and the second shock absorber of a pair are fastened to the same cross-member.

For example, the first shock absorber and the second shock absorber of a pair are fastened respectively to the first branch and to the second branch of the same cross-member.

This arrangement tends to maximize the relative travel between a piston and the associated body.

In a second alternative, the first shock absorber of a pair, referred to as the "given" pair, is fastened to one cross-member and the second shock absorber of said given pair is fastened to the other cross-member.

This arrangement makes it possible to conserve an arrangement of the shock absorbers of a pair on either side of an anteroposterior plane of the landing gear. Furthermore, this arrangement makes it possible to obtain additional action on the oscillation in pitching of the fuselage relative to the landing gear.

For example, the first shock absorber is fastened to the first branch of a cross-member and the second shock absorber is fastened to the second branch of the other cross-member.

Furthermore, the first pipe may have a first check valve for preventing fluid from passing from the second shock absorber to the first shock absorber and for allowing fluid to pass from the first shock absorber to the second shock absorber, and the second pipe has a second check valve for preventing fluid from passing from the first shock absorber to the second shock absorber and for allowing fluid to pass from the second shock absorber to the first shock absorber.

Except in the circumstances of an extreme landing taking place at high speed, the cross-members of skid landing gear deform elastically.

The elastic return of the cross-members towards their initial state after making contact with the ground takes place while restoring the energy that has been stored. Such elastic return can cause the aircraft to rebound, which can be disagreeable or even harmful.

The first check valve and the second check valve tend to limit such a rebound.

During the landing mode of operation, when the cross-member deforms elastically as a result of the landing gear making contact with the ground, the first check valve and the second check valve open, and thus allow the fluid to move from one shock absorber to the other via the pipes.

In contrast, during the elastic return of the cross-member towards its initial state prior to landing, the first and second check valves close the pipes. The fluid then flows through the throttling orifices, thereby effectively tending to brake the elastic return of the cross-member towards its initial state, and thus to brake the rebounding of the aircraft.

In another aspect and in a first variant, at least one cross-member is a continuous cross-member having a central portion extending between the first and second branches.

In a second variant, at least one cross-member is a discontinuous cross-member having an empty space between the first and second branches of the cross-member.

Furthermore, in an embodiment, said piston includes at least one said throttling orifice putting the first and second chambers into fluid flow communication.

For example, each throttling orifice is a passage made through the piston.

Under such circumstances, said piston is interposed between the primary chamber and the secondary chamber.

In such an arrangement, the primary chamber represents a top chamber and the secondary chamber represents a bottom chamber, the top chamber being arranged substantially over the bottom chamber.

In an alternative arrangement, the primary chamber represents the bottom chamber and the secondary chamber represents the top chamber.

Furthermore, and by way of example, the first and second shock absorbers of a pair may be identical in order to enhance coupling.

In addition to landing gear, the invention also provides an aircraft having a fuselage connected to such landing gear.

Furthermore, the invention also provides a method of shock absorbing landing gear for an aircraft, said landing gear being provided with a first longitudinal bearing skid and a second longitudinal bearing skid together with a cross-member referred to as a "front" cross-member and a cross-member referred to as a "rear" cross-member, each extending transversely and suitable for connecting the first skid and the second skid to a fuselage of said aircraft, each cross-member having a first branch connected to the first skid and a second branch connected to the second skid, the first skid and the second skid being situated transversely on either side of a vertical anteroposterior plane of symmetry, said landing gear including at least one pair of shock absorbers comprising a first shock absorber and a second shock absorber arranged transversely on either side of said anteroposterior plane, each shock absorber being attached to a cross-member, each shock absorber comprising a cylinder defining an inside space and a rod carrying a piston, said inside space being subdivided at least into a "primary" chamber possessing an inside volume that decreases when said rod is pushed into said cylinder and into a "secondary" chamber, each of the chambers being filled with a fluid, each shock absorber including at least one throttling orifice putting the secondary chamber and the primary chamber into fluid flow communication, each piston defining at least part of a chamber in order to move said fluid.

In this method, the primary chamber of the first shock absorber of a pair is put into fluid flow communication with the secondary chamber of the second shock absorber of said pair by a pipe referred to as the "first" pipe, and the secondary chamber of the first shock absorber of said pair is put into fluid flow communication with the primary chamber of the second shock absorber of said pair by a pipe referred to as the "second" pipe.

BRIEF DESCRIPTION OF THE SEVERAL VIEWS OF THE DRAWINGS

The invention and its advantages appear in greater detail from the following description of embodiments given by way of illustration and with reference to accompanying figures, in which.

Elements present in more than one of the figures are given the same references in each of them.

DETAILED DESCRIPTION OF THE INVENTION

It should be observed that three mutually orthogonal directions X, Y, and Z are shown in the figures.

The first direction X is said to be longitudinal. The term "longitudinal" relates to any direction that is substantially parallel to the first direction X.

The second direction Y is said to be transverse. The term "transverse" relates to any direction substantially parallel to the second direction Y.

Finally, the third direction Z is said to be in elevation. The term "in elevation" relates to any direction substantially parallel to the third direction Z.

Figure 1:
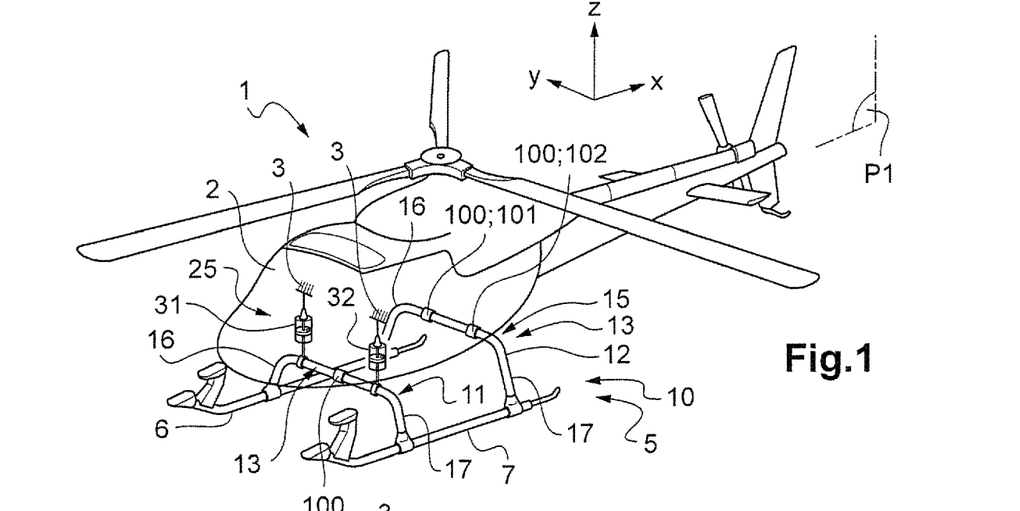
FIG. 1 is a view of an aircraft provided with landing gear of the invention.

FIG. 1 shows an aircraft 1 and more particularly a rotorcraft.

The aircraft 1 has a fuselage 2 that extends longitudinally along a vertical anteroposterior plane P1 of symmetry. The fuselage 2 is also secured to skid landing gear 5. In particular, the landing gear 5 is connected to frames 3 of the fuselage 2, that can be seen in FIGS. 2 to 5.

It should be observed that a portion of the fuselage 2 is shown as being transparent in FIG. 1 in order to enable the landing gear 5 to be seen.

The landing gear 5 has a first longitudinal bearing skid 6 referred to as "first skid" and a second longitudinal bearing skid 7 referred to as "second skid" arranged on either side of the anteroposterior plane P, possibly in symmetrical manner.

Under such circumstances, the landing gear has two cross-members 10, each extending transversely and connecting the first skid 6 and the second skid 7 to the fuselage. In particular, the landing gear 5 has a front cross-member 11 and a rear cross-member 12.

Each cross-member 10 is provided with a first branch 16 that is secured to the first skid 6 and a second branch 17 that is secured to the second skid 7. The first branch 16 and the second branch 17 of a given cross-member are arranged on either side of the anteroposterior plane P1, possibly in symmetrical manner.

The branches are sometimes referred to as "downward branches" insofar as these branches extend from the central portion towards a skid going towards the ground. The branches extend at least in elevation from a top to a foot secured to a skid. Each branch may comprise one or more tubes, and possibly one or more sleeves, together with means for connection to a skid.

Furthermore, each cross-member shown diagrammatically in FIG. 1 is continuous. Such a continuous cross-member has a central portion 13 that is substantially rectilinear and that is secured to the first branch 16 and to the second branch 17.

Figure 2:
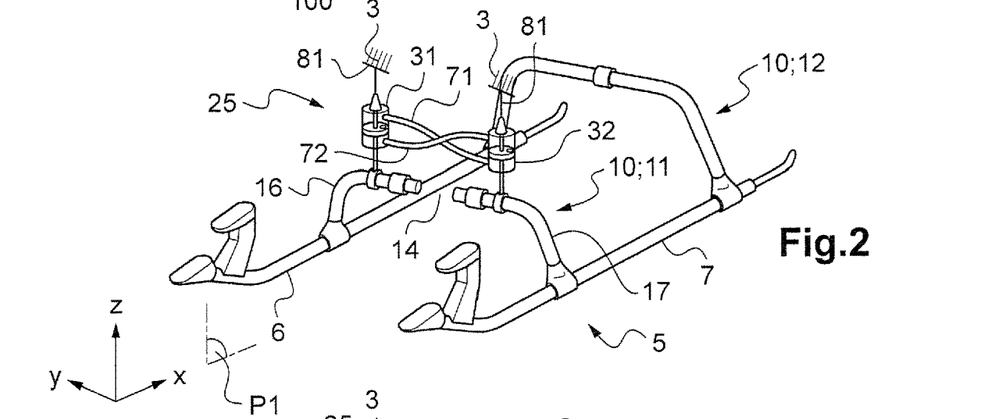
FIG. 2 is a view of landing gear of the invention having a pair of shock absorbers arranged on a discontinuous cross-member.

Nevertheless, and with reference to FIG. 2, at least one cross-member may be a discontinuous cross-member. Under such circumstances, an empty space 14 lies between the first and second branches 16 and 17 in the vicinity of the anteroposterior plane P1.

Independently of the nature of the cross-members and with reference to FIG. 1, the landing gear 5 is connected to a carrier structure of the aircraft by means of its cross-members.

By way of example, each cross-member is thus fastened to a frame of the aircraft by at least one attachment system 100.

For landing gear having three attachment points of the type shown in FIG. 1, one cross-member is fastened via two attachment systems 101 and 102 to a frame, while the other cross-member is fastened via at least one attachment system 100 to another frame.

Figure 4:
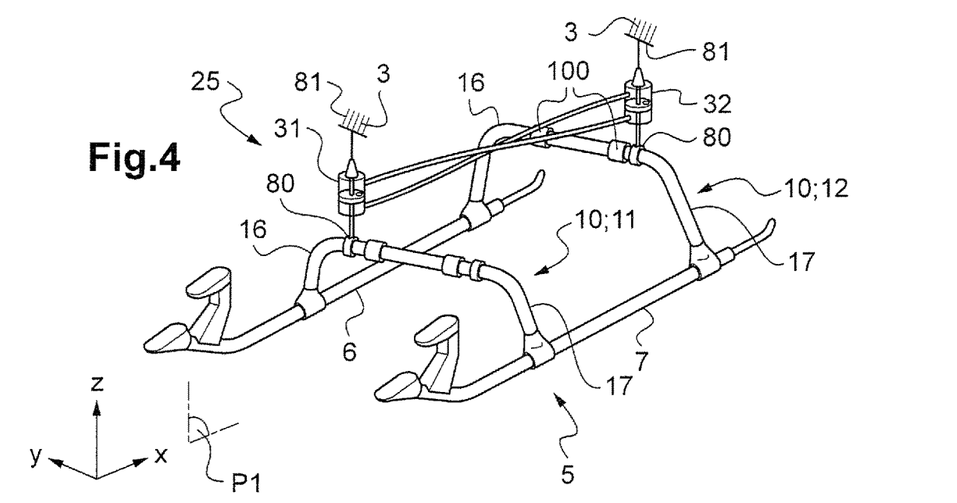
FIG. 4 is a view of landing gear of the invention provided with a pair of shock absorbers comprising two shock absorbers arranged respectively on two cross-members.
Figure 13:
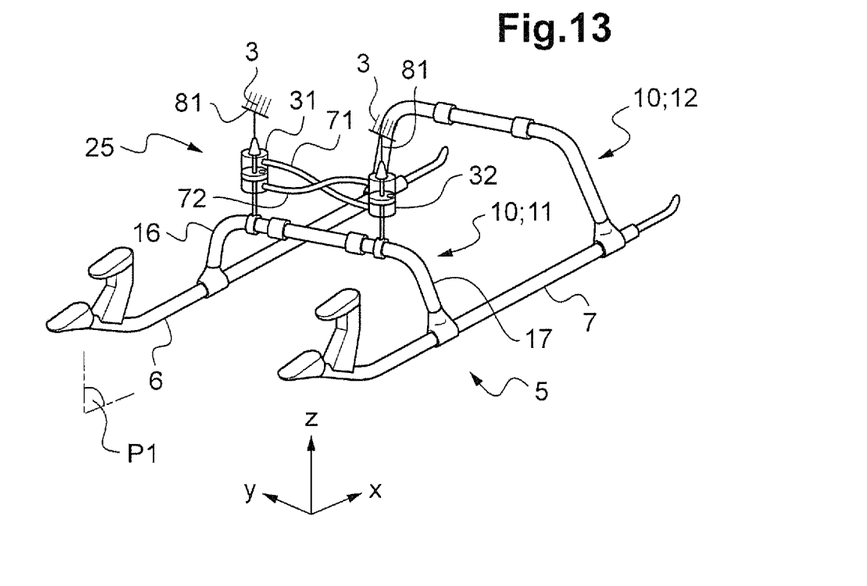
FIG. 13 is a view of landing gear of the invention having four attachment points and including a pair of shock absorbers arranged on a continuous cross-member.

Nevertheless, the landing gear may have four attachment points. FIGS. 4 and 13 show examples of such landing gear.

Figure 3:
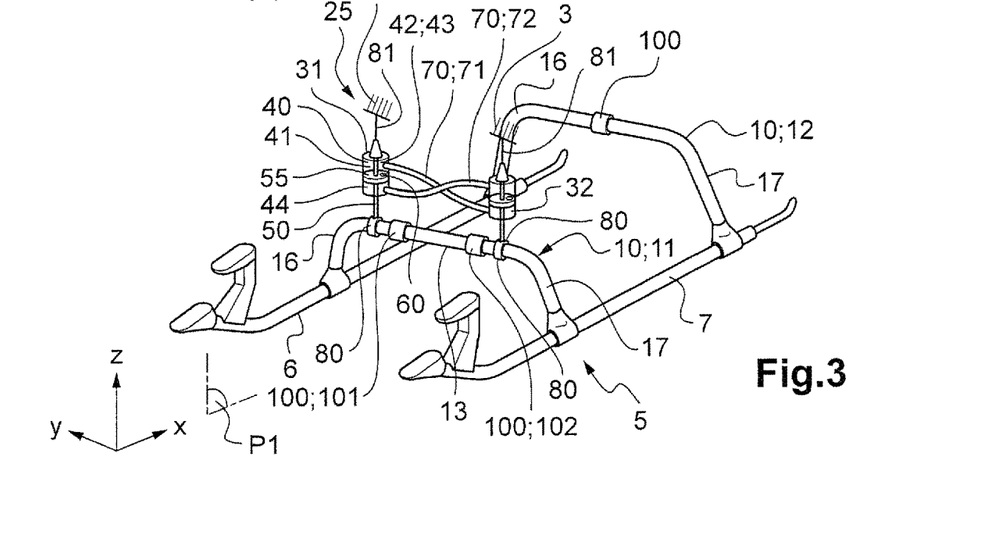
FIG. 3 is a view of landing gear of the invention having a pair of shock absorbers arranged on a continuous cross-member, each shock absorber having a piston carried by a rod connected to a cross-member.

In the invention, and with reference to FIG. 3, the landing gear 5 is provided with a shock absorber arrangement 20.

The shock absorber arrangement 20 comprises at least one pair 25 of shock absorbers. FIG. 3 shows a single pair of shock absorbers. Nevertheless, the landing gear may have a plurality of pairs, and for example it may have a respective pair of shock absorbers arranged on each of the cross-members.

With landing gear having three attachment points, at least one shock absorber pair may be arranged on a cross-member having a single attachment point.

Each pair 25 of shock absorbers has a first shock absorber 31 and a second shock absorber 32. The first and second shock absorbers 31 and 32 are arranged on either side of the anteroposterior plane P1, possibly in symmetrical manner. The first and second shock absorbers 31 and 32 may possibly be identical.

The first shock absorber 31 and the second shock absorber 32 of a pair are each interposed between a cross-member and the fuselage of the aircraft.

Thus, the first shock absorber 31 and the second shock absorber 32 are each fastened to a cross-member, specifically a cross-member that may be continuous or discontinuous depending on the variant.

In the first alternative shown in FIG. 3, the first shock absorber 31 of a pair 25 is fastened to the first branch 16 of a cross-member. The second shock absorber 32 of the pair 25 is then fastened to the second branch 17 of the same cross-member.

Nevertheless, in the second alternative shown in FIG. 4, the first shock absorber 31 of a pair 25 is fastened to one cross-member, while the second shock absorber 32 of the pair is fastened to the other cross-member.

By way of example, the first shock absorber 31 is fastened to the first branch 16 of one cross-member, specifically the front cross-member in FIG. 4. The second shock absorber 32 is then fastened to the second branch 17 of the other cross-member, specifically the rear cross-member.

Furthermore, and with reference to FIG. 3, each shock absorber 31, 32 of a pair includes a cylinder 40 that defines an inside space 41. The shock absorber 31, 32 also has a rod 50 carrying a piston 55 that is received in the inside space 41. The piston 55 and the cylinder 40 can move relative to each other in translation. Thus, the piston 55 slides in the inside space 41, or the cylinder 40 slides along the piston 55.

The rod 50 may be a through rod, i.e. a rod that passes right through the piston so as to reach a guide of the cylinder. This characteristic makes it possible to obtain chambers of identical sections, each section being taken on a plane perpendicular to the axis of the rod and parallel to a face of the piston.

In a first embodiment shown in particular in FIG. 3, at least one shock absorber 31, 32 has a first attachment system 80 fastening the rod 50 of the shock absorber 31, 32 to a cross-member 10. Under such circumstances, a second attachment system 81 fastens the cylinder 40 of the shock absorber 31, 32 to said fuselage 2.

For example the first and/or second attachment system may comprise at least one hinge, or indeed a ball joint hinge.

Figure 5:
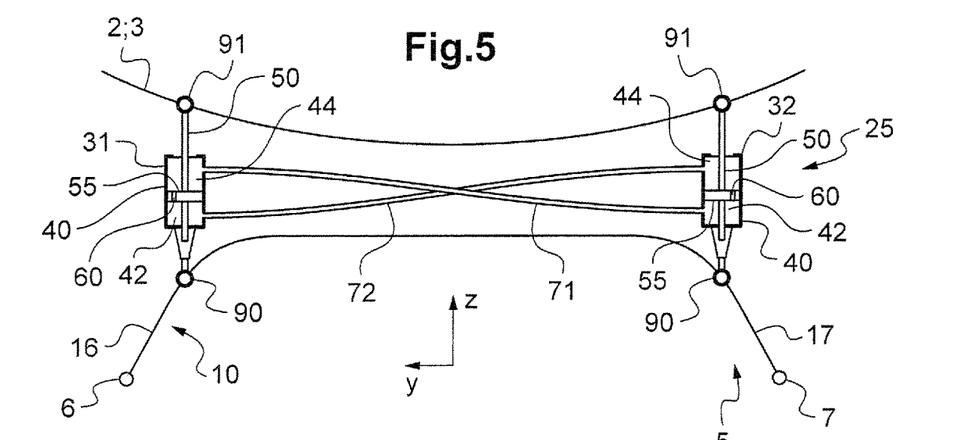
FIG. 5 is a view of landing gear of the invention having a pair of shock absorbers arranged on a continuous cross-member, each shock absorber having a cylinder connected to a cross-member.

In a second embodiment shown in particular in FIG. 5, at least one shock absorber 31, 32 has first attachment means 90 fastening the cylinder 40 of the shock absorber 31, 32 to a cross-member 10. In addition, second attachment means 91 fasten the rod 50 of the shock absorber 31, 32 to the fuselage 2.

By way of example, the first and/or second fastener means may comprise at least one hinge, or indeed a ball joint hinge.

Figure 6:
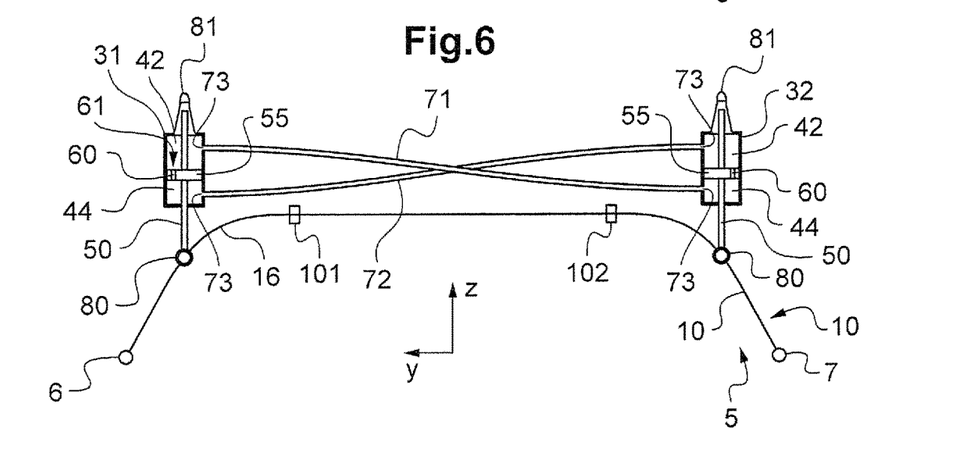
FIGS. 6 to 9 are views explaining the operation of the invention.

Furthermore, and with reference to FIG. 6, the inside space 41 of each shock absorber is subdivided at least into a chamber 42 referred to as a "primary" chamber and into a chamber 44 referred to as a "secondary" chamber. The primary chamber and the secondary chamber are filled with a fluid, such as oil or a gas, for example.

The primary chamber 42 of a shock absorber possesses an inside volume 43 that decreases when the rod 50 is pushed into the cylinder 40, i.e. when the shock absorber retracts. Such retraction amounts to shortening the length of the shock absorber lying in elevation between the two ends of the shock absorber. Conversely, the inside volume 43 of the primary chamber increases when the rod 50 tends to leave the cylinder 40, i.e. when the shock absorber extends.

Furthermore, each shock absorber has at least one throttling orifice 60 that puts the secondary chamber 44 into fluid flow communication with the primary chamber 42.

Under such circumstances, the piston 55 of a shock absorber defines in part at least one chamber for moving the fluid within the shock absorber, possibly from one chamber to the other chamber through at least one throttling orifice 60.

For example, the piston 55 has at least one throttling orifice 60 putting the primary chamber 42 into fluid flow communication with the secondary chamber 44 of the shock absorber. The throttling orifice passes right through the piston.

In addition, the piston 55 is interposed between the primary chamber 42 and the secondary chamber 44. The piston 55 then defines the secondary chamber and the primary chamber in part.

Under such circumstances, one chamber of a shock absorber is a top chamber situated above the other chamber, which represents a bottom chamber. In the embodiment of FIG. 6, the primary chamber of a shock absorber is a top chamber, the secondary chamber of the shock absorber being a bottom chamber. In the embodiment of FIG. 5, the primary chamber of a shock absorber is a bottom chamber, the secondary chamber of the shock absorber being a top chamber.

Furthermore, and independently of the embodiment, the primary chamber 42 of the first shock absorber 31 in a pair is in fluid flow connection with the secondary chamber 44 of the second shock absorber 32 of that pair via a pipe 70 referred to as a "first" pipe 71. Likewise, the secondary chamber 44 of the first shock absorber 31 is in fluid flow connection with the primary chamber 42 of the second shock absorber 32 via a pipe 70 referred to as a "second" pipe 72.

Each chamber of the first shock absorber is then in fluid flow communication with a chamber of the second shock absorber via a respective pipe.

In addition, each pipe 70 opens out into a chamber via a flow section referred to as a "pipe" section 73. Each throttling orifice 60 opens out into a chamber via a flow section referred to as a "throttling" section 61. Under such circumstances, each pipe section 73 may present an area referred to as the "pipe" area that is greater than an area referred to as the "section" area of each throttling section 61.

FIGS. 7 to 10 illustrate the operation of landing gear of the invention. This illustration is based on the embodiment of FIG. 6. Nevertheless, the various embodiments shown in FIGS. 2 to 5 operate in similar manner.

Figure 7:
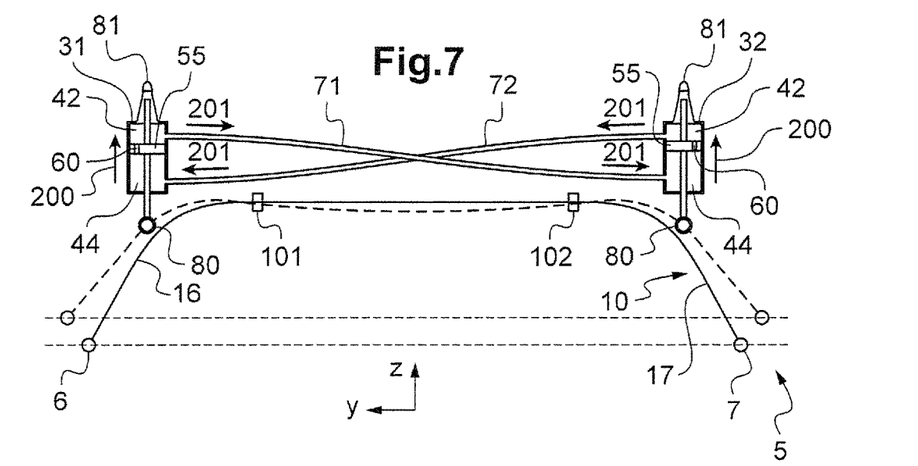

With reference to FIG. 7, during a landing mode of operation, the pistons of the first and second shock absorbers 31 and 32 of a pair move relative to the associated cylinders, which movements are represented by arrows 200. These movements are of the same kind.

In FIG. 7, when the fuselage moves down towards the landing gear, the pistons tend to reduce the volume of the primary chamber in each shock absorber while the shock absorber is retracting. Under such circumstances, the fluid contained in a primary chamber of a shock absorber tends to be discharged to the secondary chamber of the other shock absorber as represented by arrows 201. The flow of fluid within the throttling orifices is little or nothing.

Figure 8:
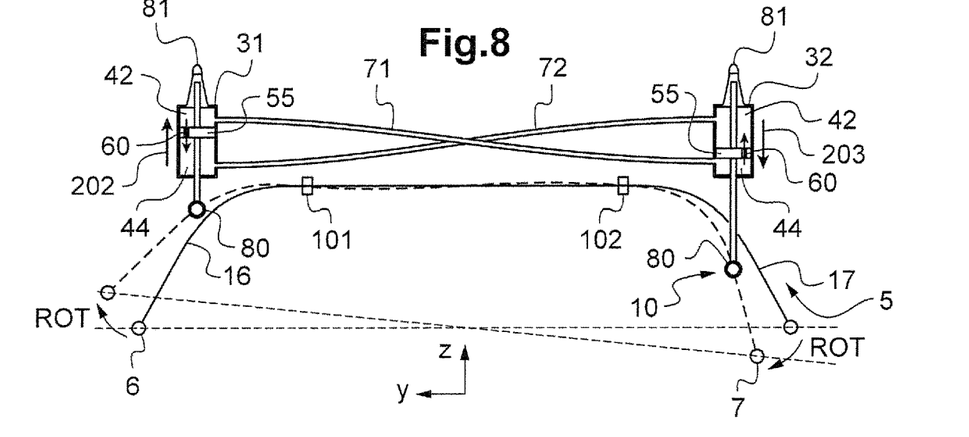

Conversely, and with reference to FIG. 8, during a roll mode of operation, the pistons of the first and second shock absorbers 31 and 32 in a pair perform respective movements of different kinds relative to the associated cylinders that are represented by arrows 202 and 203.

In FIG. 8, a roll movement ROT causes the first shock absorber 31 to retract and the second shock absorber 32 to extend. The piston of the first shock absorber 31 tends to expel the fluid contained in the primary chamber of the first shock absorber into the first pipe. In contrast, the piston of the second shock absorber 32 tends to expel the fluid contained in the secondary chamber of the second shock absorber into the first pipe. As a result, these opposing actions tend to prevent fluid flowing within the pipes 70. Under such circumstances, the fluid flows within the shock absorbers 31, 32 through the throttling orifices.

Figure 9:
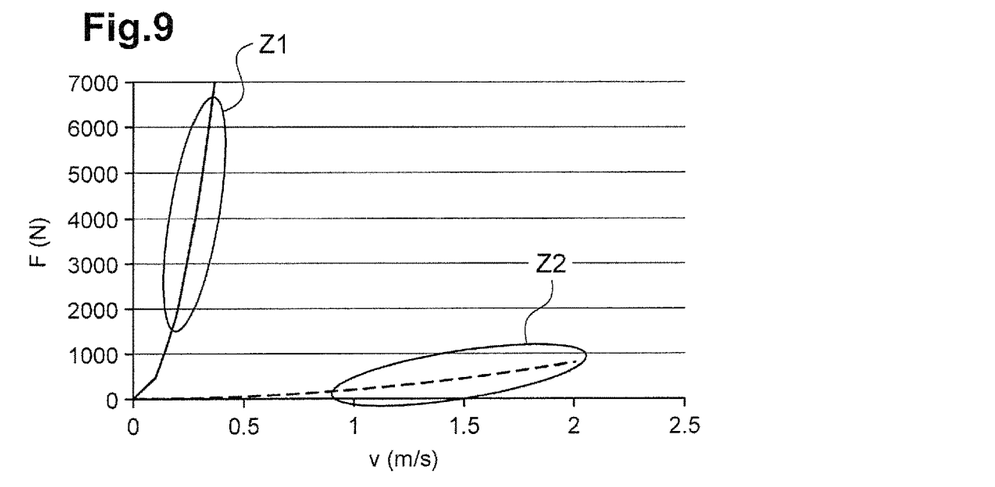

FIG. 9 is a graph plotting the travel speed V of the piston of a shock absorber relative to the associated cylinder along the abscissa axis in meters per second, and plotting the opposing force F generated by the shock absorber up the ordinate axis in newtons.

The pipes 70 that have been installed serve to dissociate the roll mode of operation from the landing mode of operation in each shock absorber. A zone Z1 shows that the invention makes it possible to obtain a shock absorber that delivers a large opposing force for a slow travel speed during the roll mode of operation. The pistons of a pair of shock absorbers move in opposition and thus oblige the fluid to pass through the throttling orifices.

Conversely, a zone Z2 shows that the invention makes it possible to obtain a shock absorber that provides little opposing force for a fast travel speed in the landing mode of operation. Specifically, the pistons of a pair of shock absorbers move in identical directions allowing the fluid to flow in the pipes.

Figure 10:
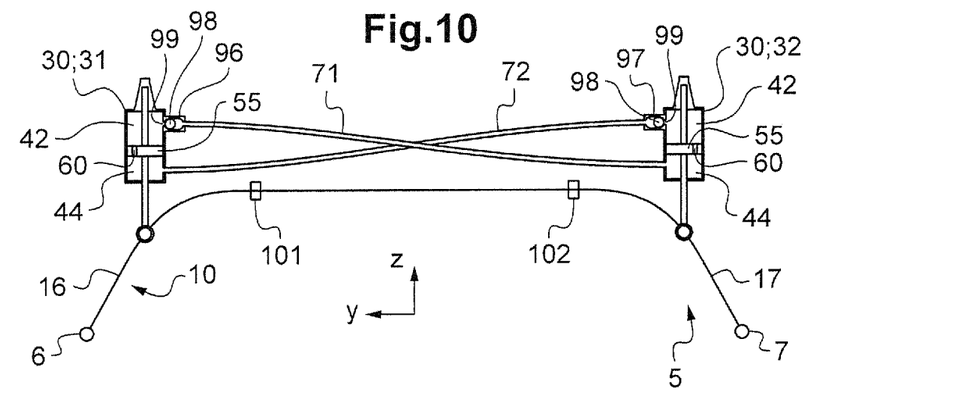
FIGS. 10 to 12 are views showing a pair of shock absorbers including check valves.

Furthermore, and with reference to FIG. 10, the landing gear 5 includes a device tending to limit rebounding of the aircraft while landing.

Specifically, the first pipe 71 includes a first check valve 96 for preventing fluid from passing from the second shock absorber 32 to the first shock absorber 31 while allowing fluid to pass from the first shock absorber 31 to the second shock absorber 32. For example, the first check valve 96 opens out into the primary chamber 42 of the first shock absorber 31.

Likewise, the second pipe 72 has a second check valve 97 for preventing fluid from passing from the first shock absorber 31 to the second shock absorber 32 and for allowing fluid to pass from the second shock absorber 32 to the first shock absorber 31. For example, the second check valve 97 opens out to the primary chamber 42 of the second shock absorber 32.

Each check valve may comprise a ball 98 and a perforated seat 99, the ball 98 being suitable for closing a perforation in said seat in a closed position and not closing said perforation in an open position.

Figure 11:
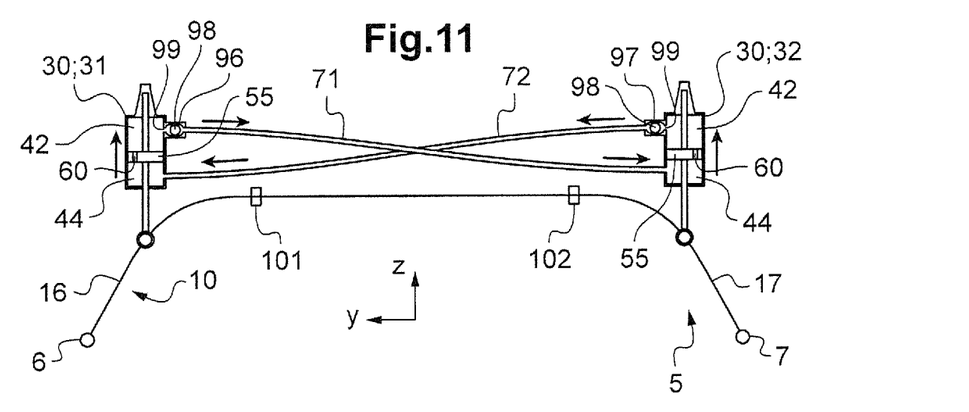

With reference to FIG. 11, when the fuselage comes closer to the landing gear during the landing mode of operation, the check valves open and thus allow the fluid present in the primary chamber of each shock absorber in a pair to go into the secondary chamber of the other shock absorber in the same pair of shock absorbers.

Figure 12:
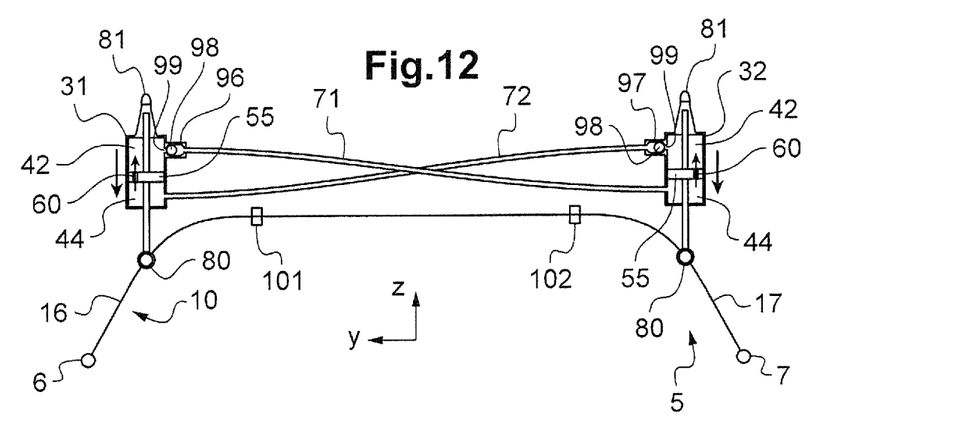

In contrast, and with reference to FIG. 12, when the fuselage tends to rebound, the check valves close. The fluid then passes through the throttling orifices, thereby effectively braking the rebound of the aircraft.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, landing gear may include at least two pairs of shock absorbers. In an embodiment, one shock absorber in each pair may be connected to a first branch of a cross-member while the other shock absorber is connected to a second branch.

A single cross-member may also have a plurality of pairs of shock absorbers. Likewise, each cross-member may have at least one pair of shock absorbers.

In addition, FIGS. 1, 2, 3, and 13 show a pair of shock absorbers arranged on a front cross-member. Nevertheless, the shock absorbers of a pair may be arranged on a rear cross-member.

What is claimed is:

1. Landing gear for an aircraft, the landing gear comprising:
   a longitudinal bearing first skid and a longitudinal bearing second skid;
   a front cross-member and a rear cross-member, each of the front and rear cross-members extending transversely and suitable for connecting the first skid and the second skid to a fuselage of the aircraft, each of the front and rear cross-members having a first branch connected to the first skid and a second branch connected to the second skid, the first skid and the second skid situated transversely on either side of a vertical anteroposterior plane of symmetry; and
   a pair of shock absorbers comprising a first shock absorber and a second shock absorber arranged transversely on either side of the anteroposterior plane, each shock absorber attached to one of the front and rear cross-members, each shock absorber comprising a cylinder defining an inside space and a rod carrying a piston, the inside space subdivided at least into a primary chamber possessing an inside volume that decreases when the rod is pushed into the cylinder and into a secondary chamber, each of the primary and secondary chambers filled with a fluid, each shock absorber including a throttling orifice fluidly connecting the secondary chamber and the primary chamber, each piston defining at least part of one of the primary and secondary chambers of the corresponding shock absorber in order to move the fluid,
   wherein the primary chamber of the first shock absorber is directly connected to the secondary chamber of the second shock absorber via a first pipe, and the secondary chamber of the first shock absorber is directly connected to the primary chamber of the second shock absorber via a second pipe,
   wherein each of the first and second pipes opens out into a primary or secondary chamber via a pipe section, each throttling orifice opening out into a primary or a secondary chamber via a throttling section, each pipe section having an area greater than an area of each throttling section.

2. The landing gear according to claim 1, wherein the rod is fastened to at least one of the cross-members and the fuselage, and the cylinder is fastened to the other of the cross-member and the fuselage.

3. The landing gear according to claim 1, wherein the cylinder fluid flows through the first and second pipes to damp vertical movement in a landing mode of the aircraft, and wherein the cylinder fluid flows through the throttling orifice of each of the shock absorbers to damp roll movement in a roll mode of the aircraft.

4. The landing gear according to claim 1, wherein the first shock absorber and the second shock absorber are both fastened to the front cross-member or are both fastened to the rear cross-member.

5. The landing gear according to claim 4, wherein the first shock absorber and the second shock absorber are fastened respectively to the first branch and to the second branch of the front cross-member or of the rear cross-member.

6. The landing gear according to claim 1, wherein the first shock absorber is fastened to one of the front and rear cross-members and the second shock absorber is fastened to the other of the front and rear cross-members.

7. The landing gear according to claim 6, wherein the first shock absorber is fastened to the first branch of one of the front and rear cross-members and the second shock absorber is fastened to the second branch of the other of the front and rear cross-members.

8. The landing gear according to claim 1, further comprising:

a first check valve positioned in the first pipe for preventing fluid from passing from the second shock absorber to the first shock absorber and for allowing fluid to pass from the first shock absorber to the second shock absorber, and a second check valve positioned in the second pipe for preventing fluid from passing from the first shock absorber to the second shock absorber and for allowing fluid to pass from the second shock absorber to the first shock absorber.

9. The landing gear according to claim 1, wherein at least one of the front and rear cross-members is a continuous cross-member having a central portion extending between the first and second branches.

10. The landing gear according to claim 1, wherein at least one of the front and rear cross-members is a discontinuous cross-member having an empty space between the first and second branches of the cross-member.

11. The landing gear according to claim 1, wherein each piston of the first and second shock absorbers includes the throttling orifice to fluidly connect the first and second chambers.

12. The landing gear according to claim 1, wherein the piston is interposed between the primary chamber and the secondary chamber.

13. The landing gear according to claim 1, wherein the first shock absorber and the second shock absorber are identical.

14. An aircraft having a fuselage connected to landing gear, wherein the landing gear is according to claim 1.

* * * * *